APPARATUS FOR TWISTING AND PLYING STRANDS

Original Filed June 22, 1964 3 Sheets-Sheet 1

INVENTOR.

Alfred W. Vibber

APPARATUS FOR TWISTING AND PLYING STRANDS

Original Filed June 22, 1964 3 Sheets-Sheet 3

INVENTOR.
Alfred W. Vibber

APPARATUS FOR TWISTING AND PLYING STRANDS

Original Filed June 22, 1964 3 Sheets-Sheet 3

INVENTOR.
Alfred W. Vibber

United States Patent Office

Re. 26,734
Reissued Dec. 9, 1969

26,734
APPARATUS FOR TWISTING AND PLYING STRANDS

Alfred W. Vibber, 560 Riverside Drive,
New York, N.Y. 10027

Original No. 3,286,450, dated Nov. 22, 1966, Ser. No. 376,820, June 22, 1964. Application for reissue Nov. 5, 1968, Ser. No. 777,544
Int. Cl. D01h *7/90;* D07b *3/04*
U.S. Cl. 57—58.3 28 Claims

Matter enclosed in heavy brackets [ ] appears in the original patent but forms no part of this reissue specification; matter printed in italics indicates the additions made by reissue.

*ABSTRACT OF THE DISCLOSURE*

*A strand twisting and/or plying spindle of the balloon creating type, such spindle including means for controlling the tension of the balloon. The illustrative spindles are downtwisters, in which the strand enters the balloon at its apex and leaves the balloon at the driven balloon creating disc or flyer. Means is provided for feeding the strand toward the balloon. A means for controlling the tension of the strand in the balloon comprises tension sensitive means disposed to engage the run of the strand extending between the feeding means and the loop.*

This invention relates to an apparatus for twisting and/or plying strands, and particularly relates to an apparatus for plying strands together by rotating one strand about a source of supply of another strand, and plying the strands together beyond such source of the other strand.

Reinforcing cord such as that employed in automobile tires, V-belts, and the like usually consists of a plied strand in the form of two strands twisted about each other but themselves having a relatively low twist. Such cord has been made in the past by twisting the two singles strands separately in the same direction, following which the twisted singles strands are doubled by being twisted together in the direction opposite the direction of twist of the singles strands. Such method involves three separate twisting operations, and, when the twisted singles strands do not flow continuously to the doubling spindle, also involves the taking up and the paying out of twisted singles strands.

To reduce the number of operations involved in the making of such cord, as well as the number of twisting spindles required with their space and power requirements, a number of different single spindle devices of the skip type have been proposed. In one of these types, such as shown in Clarkson Patents Nos. 2,503,242 and 2,729,051, the two singles strands are fed at substantially constant speed by separate constantly driven capstans to a plying point from which they are withdrawn under substantially constant tension. In another type of plying spindle, the strand to be ballooned enters the balloon through a storage disc, the outer ballooning strand being plied with an inner strand at a floating plying point near the apex of the balloon. In yet another type, such as shown in my prior Patent No. 2,857,730 and Clarkson Patent No. 2,986,865, the singles strands are fed toward the plying point by separate capstans driven at constant speed, and are withdrawn from the plying point at a variable speed, such speed being governed by variations in the tension of the outer, ballooning strand.

The present invention, in some aspects thereof, represents an improvement upon applicant's pending application Ser. No. 275,416, filed April 24, 1963, now Patent No. 3,153,893, although it is obviously not confined to use with the apparatus there shown, as will be pointed out below. The present invention is illustrated in connection with embodiments of twisting apparatus shown in such application Ser. No. 275,416, which eliminate the need for a constant tension take-up of the plied strands, with its attendant complications and need for frequent maintenance. At the same time, it gives much closer control of the plied cord from the standpoint of uniformity than does plying apparatus employing a floating plying point. Additionally, such apparatus takes up the plied cord at constant speed, thereby producing cord of a high uniformity of twist.

In accordance with the present invention, the tension of the ballooning strand is controlled, as in application Ser. No. 275,416, by varying the height of the balloon. The balloon height is governed, in accordance with the present invention, not by varying contact between an annular member and the balloon, as in applicant's said prior invention, but in response to variations in a tension-sensitive means engaging a travelling non-ballooning singles strand or plied strand forming parts of the strand system of the spindle. In the first two embodiments to be described, the strand thus engaged is the outer singles strand, the tension-sensitive means engaging such strand between the constant speed feeding capstan for such strand and the entering end of the balloon. In the third embodiment, the tension-sensitive means engages the plied strand or cord between the plying point and the constant speed take-up capstan for the cord.

The present invention has among its objects the provision of a novel mechanism for controlling the tension of the balloon of a twisting and/or plying spindle.

The invention has among its further objects the provision of a plying spindle of the skip type employing such novel balloon control.

Another object of the invention lies in the provision of such balloon control in a spindle of the indicated type wherein the taking up of the plied strand from the plying point takes place at substantially constant speed, whereby the desired number of twists per unit length of the plied cord may be accurately maintained throughout the length of the cord.

A further object of the invention lies in the provision of such balloon control in a spindle of the skip type wherein correlation between the tensions in the two strands approaching the plying point is more easily achieved, and wherein such tensions may both be readily adjusted, the tension in the balloon being adjustable in a novel manner.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a fragmentary view in side elevation of a first embodiment of a spindle for plying strands together to form a cord in accordance with the present invention;

FIG. 6 is a fragmentary view in side elevation of a third embodiment of twisting and plying spindle in accordance with the present invention.

Figure 1:
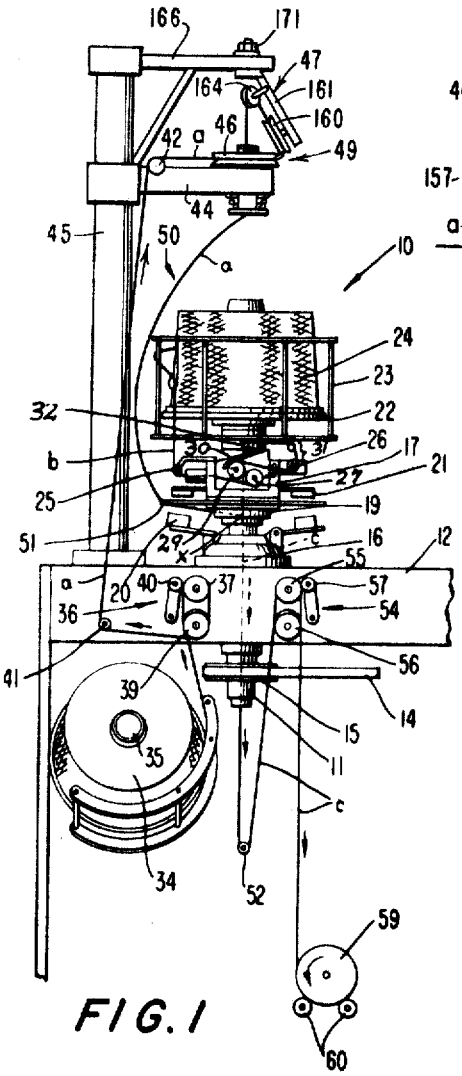
Figure 3:
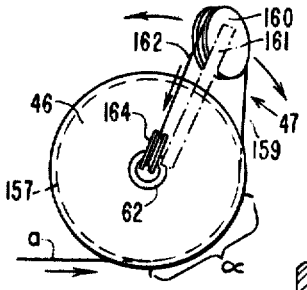
FIG. 3 is a simplified view in horizontal section of the balloon control device of FIGS. 1 and 2, the section being taken along the line 3—3 of FIG. 2.
Figure 2:
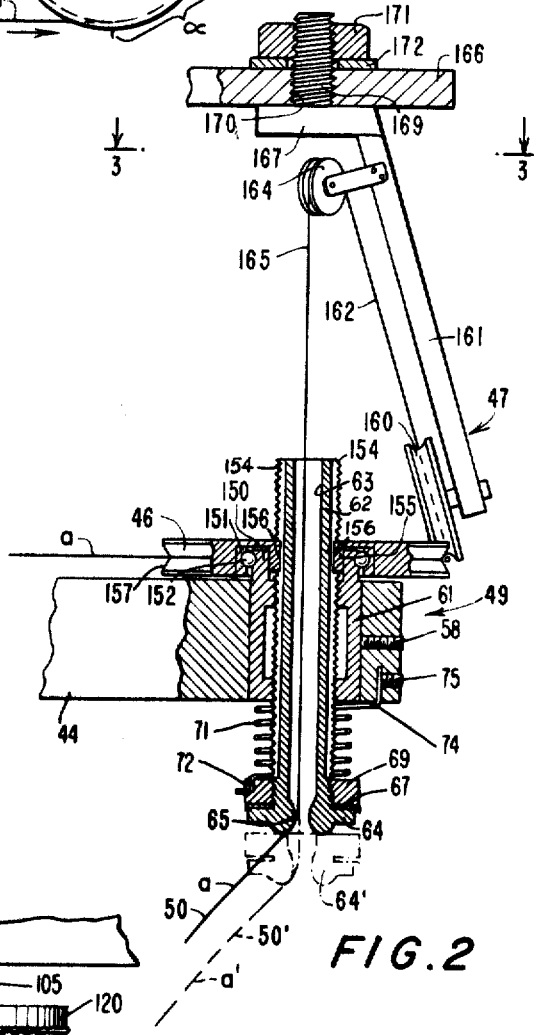
FIG. 2 is a view in side elevation on an enlarged scale of the balloon size controlling mechanism employed in the apparatus of FIGS. 1 and 4.
Figure 5:
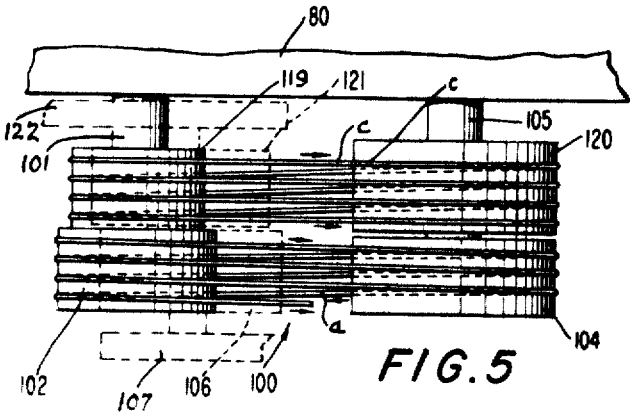
FIG. 5 is a fragmentary somewhat schematic view in tilted plan of the combined capstan employed in the apparatus of FIG. 4 which serves to feed the outer singles strand toward the balloon at constant speed and the plied cord away from the plying point at constant speed.
Figure 4:
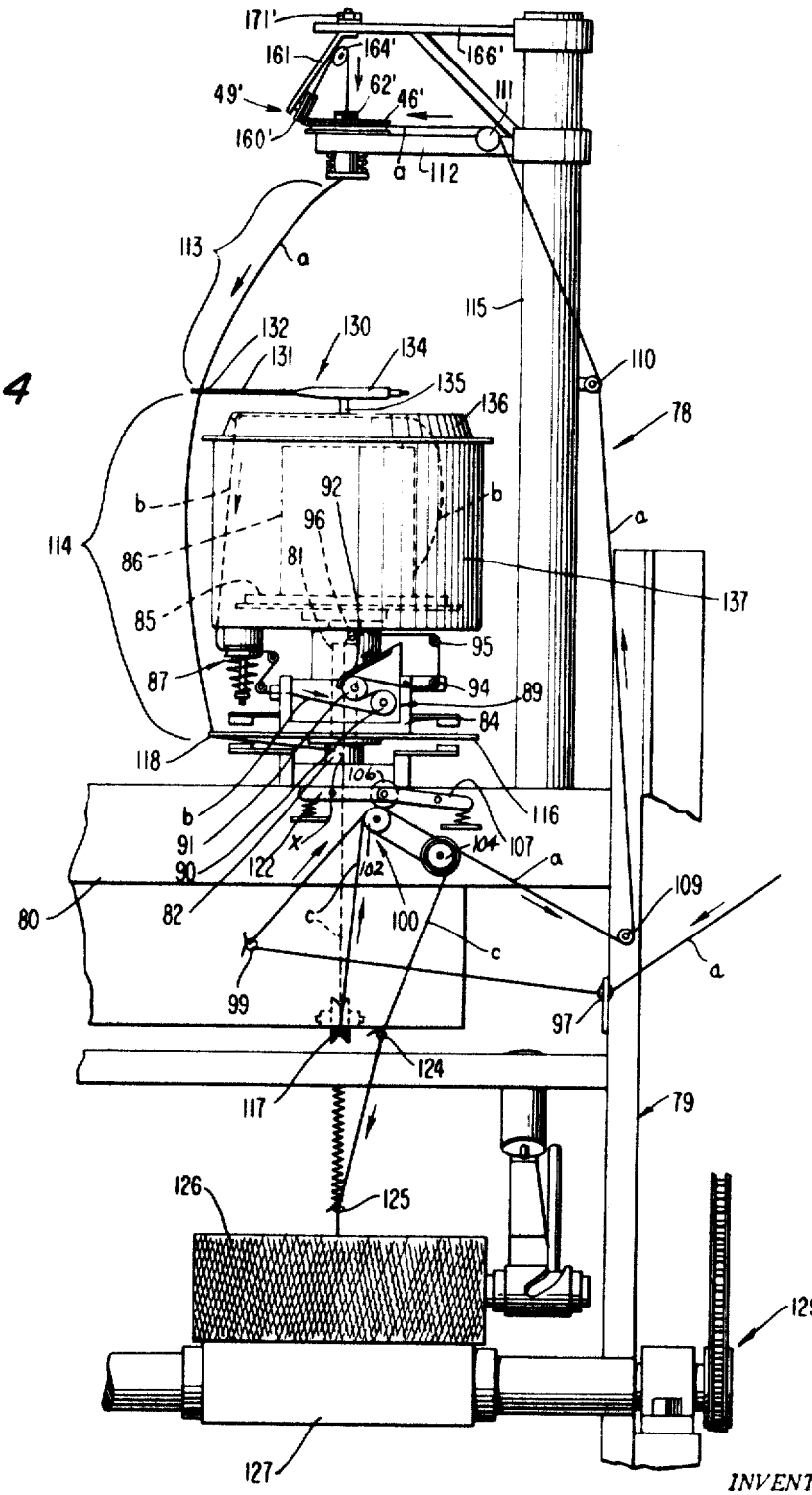
FIG. 4 is a fragmentary view in side elevation of a second embodiment of twisting and plying spindle in accordance with the present invention.
Figure 7:
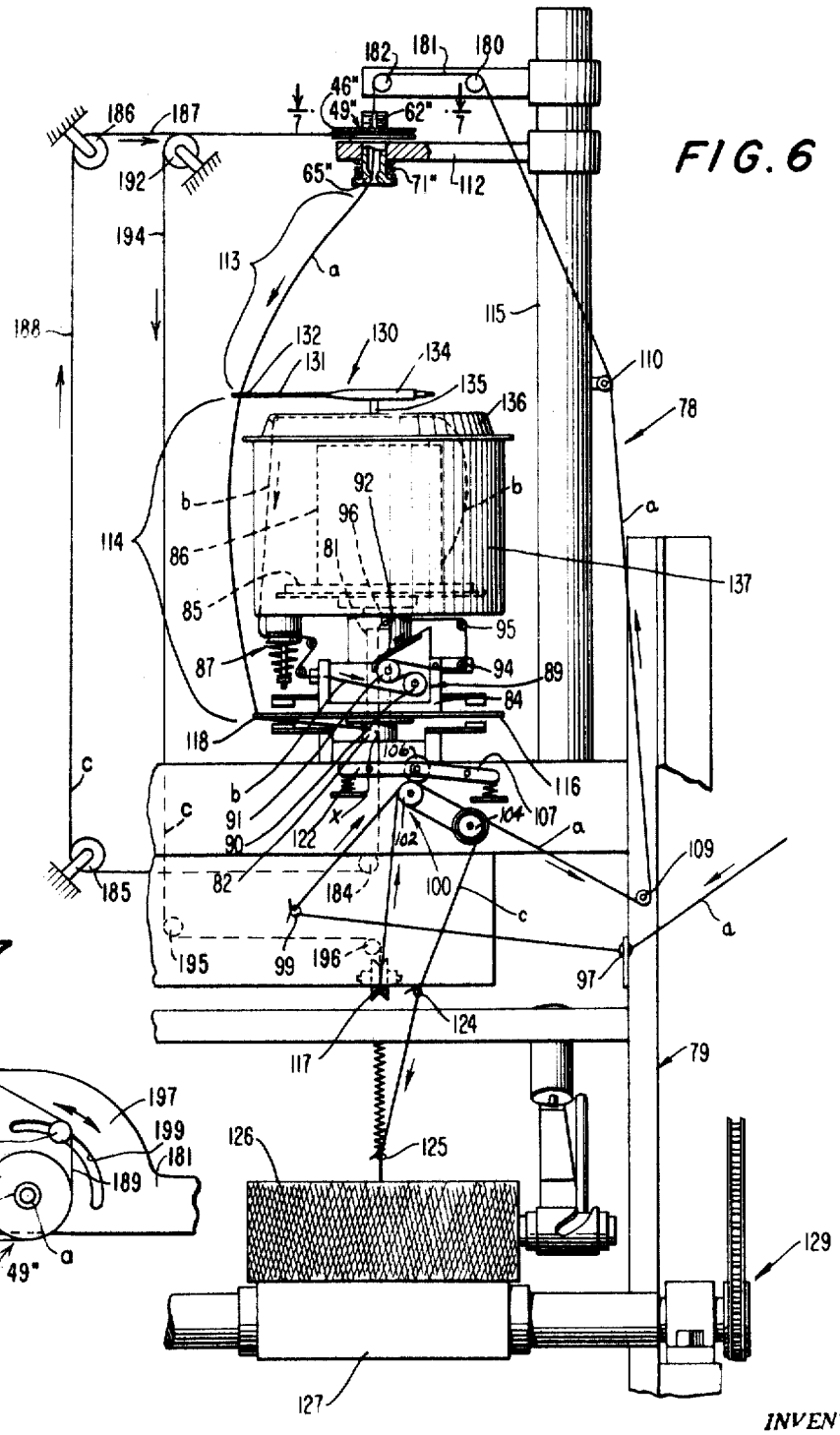
FIG. 7 is a simplified view in plan of the balloon control device employed in the apparatus of FIG. 6.

As will be apparent from the above, three embodiments of apparatus in accordance with the invention are shown herein, the first embodiment being shown in FIGS. 1–3, inclusive, the second being shown in FIGS. 4 and 5, and the third being shown in FIGS. 6 and 7. The first two embodiments employ the balloon control device more specifically shown in FIGS. 2 and 3. The third embodiment employs the balloon control device of FIG. 7. As will be more readily apparent below, the first embodiment differs from the two latter embodiments of apparatus, not only as to the specific means employed to feed the outer, ballooned strand into the balloon and to withdraw the plied strand or cord from the plying point, but as to the manner of variation of the tension existing in the ballooning strand upon changes in the diameter of the balloon, and as to the role played by the plying point in conjunction with the balloon control device in restoring the balloon to such diameter as to cause the strand in the balloon to be under a desired predetermined tension. In the first two embodiments, the tension in the outer singles strand is employed to adjust the height of the balloon. In the last embodiment, the tension in the plied strand or cord beyond the plying point is employed to adjust the height of the balloon.

Turning now to FIG. 1, the plying spindle there shown is generally designated by the reference character 10. Spindle 10 has a vertically disposed centrally hollow main shaft 11 which is rotatably mounted in a suitable bearing in a housing 16 affixed to a supporting frame 12. The shaft 11 is driven by a belt 14 entrained over a pulley 15 affixed to shaft 11, the belt being driven by a suitable power source such as an electric motor, not shown. Supported on shaft 11 by a bearing contained in a housing 19 is a support 17 which is held from rotation by pairs of coacting lower and upper magnets 20 and 21 mounted on housings 16 and 19, respectively.

A package support 22 is mounted on support 17, support 22 having means for holding a strand package 24 centrally thereon. Package 24, which supplies the inner strand b, is surrounded by a cage-like guard 23, a part of which also functions to tension the strand b preliminarily in the travel of such strand downwardly to a guide pulley 25 mounted on support 17. The spindle 10 as thus far described is generally similar to that shown and described in Clarkson Patent No. 2,689,449.

The strand handling device 26 on support 17 of the present apparatus is an idle strand tensioning means which is preferably adjustable to vary its strand tensioning effect. The tension device 26 shown is generally similar to that shown in FIG. 5 of the patent to Klein, No. 2,671,305, changed as to its orientation and the manner of feeding the strand into and away from the tension device. It is to be understood that other known strand tensioning devices may, if desired, be substituted for the tensioning device 26 here shown and described.

The strand b, after passing under guide pulley 25, travels to the right (FIG. 1) initially to contact the right-hand roller 27 at the bottom thereof, and then travels counterclockwise around the roller to contact the left-hand roller 29 adjacent the bottom thereof. The strand then travels clockwise around roller 29 and between such roller and an adjustably tensioned leaf spring 30 which has a curved free end overlying and conforming to the curvature of the roller 29. As set forth in the above Klein patent, the ends of the shafts mounting rollers 27 and 29 are supported in guideways (not here shown) which lie generally parallel to the direction of the runs of the strand approaching roller 27 and leaving roller 29, the tension in the strand and the force exerted on the roller 29 through strand b by the leaf spring 30 causing the strand to be nipped forcibly between the rollers. The leaf spring 30 is secured at its upper end to support 17; the spring is adjustably thrust toward roller 29 by a set screw threaded into a bracket affixed to support 17.

From the top of roller 29 the strand b travels to the right to a roll guide set 31, and thence progresses to a canted fixedly journalled guide roll 32 which directs it downwardly centrally into the open upper end of the hollow shaft 11 of the spindle. Strand b is pulled downwardly through the bore in shaft 11 to meet and be plied with a second strand a at a plying point X within the shaft.

The strand a is supplied by an outer strand package 34 mounted on a fixed package support having a central package guide 35. From package 34, after being preliminarily tensioned by means not shown, the strand a proceeds to a capstan set 36 which feeds it forward at substantially constant speed. Capstan set 36 may be constructed and driven in the same manner as the capstan for feeding the strand there designated b in FIG. 8 of Clarkson Patent No. 2,729,051. Capstan set 36 of the present apparatus has two vertically spaced rollers 37, 39, both driven in synchronism with shaft 11, the lower roller 39 being tipped at a small angle, as shown. Strand a travels about rollers 37, 39 a plurality of times in laterally spaced wraps, passing between roll 37 and a spring pressed idle roll 40, and then leaves the capstan set at the bottom of roller 39 to travel about a fixedly mounted guide pulley 41. From pulley 41 the strand proceeds upwardly to a further fixedly mounted guide pulley 42 which is mounted on a cross arm 44 secured to a fixed standard 45 rising from frame 12. From pulley 42 the strand travels to a further pulley 46, journalled on cross arm 44, which forms a part of a balloon control device 49 in accordance with the invention, from which it proceeds downwardly to an apex guide for the balloon 50 formed in strand a by the spindle. The apex guide is here shown as being a part of the balloon control device 49, to be described. Such device 49 includes means for sensing changes in the tension in the strand a approaching the balloon, and means responsive to the first named means for changing the size of the balloon.

The strand a travels from pulley 46 to an adjustable guide means 47, to be described, to a vertically adjustable guide 65 which is a part of the balloon control device 49, and thus into the balloon 50 formed in the strand by a flyer disc 51 fixedly secured to shaft 11. Disc 50 has a strand guiding eye adjacent its edge, the strand passing through such eye and thence generally radially and somewhat downwardly beneath the flyer disc into an opening in the side of shaft 11, in a manner similar to that shown in FIG. 6 of Clarkson Patent No. 2,729,051. Within the bore in shaft 11 generally below the radial passage through the sidewall thereof there is affixed a cord forming die (not shown) within which equal lengths of the strands a and b are wrapped about each other at the plying point X. After leaving the plying point, the now formed cord c travels downwardly through the bore in shaft 11, out the bottom end thereof, and downwardly to a fixedly mounted guide pulley 52.

From pulley 52 the cord c travels upwardly to a second capstan set 54 which is similar to the above described capstan set 36. The opposed vertically spaced rolls 55, 56 of such capstan set are driven at a constant speed from and synchronized with the shaft 11. The cord passes around rolls 55, 56 a plurality of times in laterally spaced wraps, being nipped between roll 55 and an idle roll 57 which is spring pressed toward roll 55. From the capstan set 54 the cord c travels downwardly at substantially constant speed to a take-up bobbin 59 which is frictionally rim-driven by one or both of its supporting rolls 60.

Turning now to FIG. 2, the construction of the balloon apex guiding and balloon control mechanism 49 is shown in detail. A nut 61 is mounted in a vertical opening adjacent the outer end of arm 44 and is retained therein by a set screw 58, as shown. An elongated, externally threaded, hollow spindle 62 is rotatably mounted in nut 61, the bore 63 in such spindle receiving the strand a as it passed downwardly from the adjustable guiding pulley into the balloon 50. The lower end of the spindle 62 has a radially outwardly extending flange 64 integral therewith, and a vertically rounded annular portion 65 inwardly thereof at the bottom of bore 63, the most constricted zone of portion 65 forming an annular guide for the apex of balloon 50.

Rising above the main body of nut 61 and integral therewith is a short sleeve 150 formed as the inner race of a ball bearing 151. The pulley 46 has a downwardly open annular groove therein which receives the bearing, the outer race 152 of the bearing being affixed to the radially outer wall of the groove in the pulley. The pulley 46 is thus mounted for rotation above and close to the top of overarm 44. The balloon control device 49 includes means which drivingly connects the pulley 46 to the spindle 62 for joint rotation while permitting vertical adjustment of the spindle as it turns with respect to the nut 61.

For this purpose, the outer surface of spindle 62 is provided with a plurality of axially extending grooves 154, which may be of square section, for example, such grooves being angularly spaced about the axis of the spindle. The hub 155 of pulley 46 inwardly of the bearing 151 is provided with radially inwardly projecting lands 156 complementary to an accurately but slidingly interfitting with the grooves 154 in the spindle 62. Turning of the pulley 46 in reverse directions thus causes the spindle 62 and the balloon apex guide 65 carried thereby to rise and fall, respectively.

The strand a upon leaving pulley 42 passes into contact with the smoothly concave periphery 157 of pulley 46, travels partially around such pulley through an angle $\alpha$ (FIG. 3), and leaves pulley 46 in a horizontal run 159 extending to a canted idle guide pulley 160. From pulley 160 the strand a travels upwardly in a run 162 toward the axis of spindle 62 to travel partially about a further idle guide pulley 164 which has its guiding surface on its exit side lying on the axis of spindle 62. From pulley 164 the strand a travels downwardly in a vertical run 165 into the top of the bore 63 in the spindle.

The strand a tends to turn the pulley 46 and the spindle 62 drivingly connected thereto in the direction of travel of the strand. The hand of the threads in nut 61 and on spindle 62 is such that rotation of such elements in the direction of travel of the strand a causes a lowering of the spindle 62 with a consequent decrease in height of the balloon 50. The torque imposed upon spindle 62 through pulley 46 by the strand a is opposed by a coil torque spring 71 which is disposed about the spindle 62 below nut 61, the spring having a lower tang 72 affixed to nut 69 and, in the embodiment shown, an upper tang 74 affixed to arm 44 as by a set screw or stud 75. If desired, in an unillustrated modified embodiment, the torque imposed by spring 71 upon spindle 62 may be adjusted during operation of the spindle by providing an annular member to which tang 74, suitably extended, is secured, such annular member being rotatably mounted on arm 44 and adjustable about its axis in order thus to adjust the spring.

During stable operation of the apparatus, the pulley 46 and spindle 62 are at rest, the torque imposed upon the pulley by strand a being balanced by the torque of spring 71. When the tension in strand a increases, the strand turns the pulley 46 to lower the apex guide 65 until the strand tension decreases sufficiently for the torque of spring 71 to balance the torque imposed on pulley 46 by the strand. When the tension in strand a decreases, the spring 71 turns the spindle 62 to raise the apex guide 65 sufficiently to restore a balance between the torque of the spring and the torque imposed on the pulley 46 by the strand a.

As is well known, the torque imposed upon a pulley by a strand slipping thereabout increases very rapidly with an increase in the angle $\alpha$ of contact or lap about the axis of the pulley. This permits the ready adjustment of the balloon control device, as by means now to be described, to adapt it for operation with different strand materials having different coefficients of friction.

The balloon control device shown permits the adjustment of the angle $\alpha$ from a small one (actually zero) to one close to 360°. Such adjustment, taken with the above described adjustment of the degree of winding of the spring 71, permits the same apparatus to be used for the processing of a wide variety of materials.

In the embodiment shown, the canted lower idle guide pulley 160 and the upper guide pulley 164 are mounted upon an upwardly and inwardly extending member 161 which depends from an upper overarm 166 affixed to standard 45. To the upper end of member 161 there is attached a plate 167, which may be circular in plan, which serves as a bearing and guide for member 161 with respect to overarm 166. Rising centrally of plate 167 and secured thereto is a stud 169 which extends through a hole 170 in overarm 166. A nut 171 on the stud acting through a spring washer 172 secures the element 161, 167 and the guide pulleys 160 and 164 carried thereby in angularly adjusted position about the axis of spindle 62, whereby the angle $\alpha$ of the lap of strand a about pulley 46 may be adjusted as desired.

It will be seen that, regardless of the adjustment of element 161, 167 and thus of the angle $\alpha$, the strand a remains "tight" in the portion thereof from its feeding capstan 37, 39, to and partially around pulley 46, and thence to the apex guide 65 for the balloon. In fact, the only salient run of strand held under resilient yielding force in the entire apparatus is the balloon itself. The described balloon control device does not require any change in the length of the strand a between capstan 37, 39 in its detection of tension variations in such strand, nor does it cause any variation in such length of strand in functioning to adjust the height of the balloon in response to tension variations in the strand a. Thus the balloon control device introduces no variables into the system which would cause it to become unstable.

In the above-described apparatus, the balloon 50 is of the type having a single bulge. The maximum diameter of the balloon lies above the flyer 51, and usually somewhat below the mid-point of the distance between the flyer and the apex guide. With such balloon, with a constant weight per unit length of the ballooning strand, the tension in the ballooning strand decreases as the diameter of the balloon increases. The tension in the inner strand remains substantially constant. Under such conditions, the plying point X serves as a compensator to restore the balloon to a desired diameter should it deviate appreciably therefrom. Thus, when the balloon increases in diameter from such desired diameter, the inner strand b tends to become the core at the plying point, a greater length of strand a than of strand b is absorbed into the plied cord in a given time, and the balloon diameter is thus decreased. The reverse action takes place when the balloon diameter becomes less than the desired diameter. Under such conditions, the action of the plying point X far overshadows the action of the adjustable apex guide, which acts in the opposite direction but has an effect which is insufficient to affect the overall stability of the system. Thus under the constant unit weight conditions described, the tension variations in strand a are insufficient to cause much vertical adjustment of the apex guide 65.

When the unit weight of the outer ballooning strand varies appreciably, however, particularly if such weight increases, the plying point X ceases to be effective as a compensator to restore the balloon to the predetermined dsired diameter; in fact, the plying point then functions to make the system unstable. Thus, assuming a substantial increase in unit weight of the ballooning strand a, the tension the balloon 50 increases when balloon diameter increases due to the great increase in the effect of centrifugal force upon the strand tension. Because the tension of the outer ballooning strand a now exceeds the tension in the inner strand b, which remains substantially constant, the outer, ballooned strand tends to become the core of the plied strand at the plying point, thereby causing less of the outer strand to be absorbed into the plied cord, and causing the balloon to increase still more in diameter.

The balloon control 49 functions to control the balloon under conditions of appreciable variation in weight per unit length of the ballooning strand under which the plying point X by itself inherently creates conditions of unstability in the system. The automatic balloon control device 49 shown herein functions in coordination with the plying point to correct variations in balloon diameter caused or accompanied by variations in the unit weight of the ballooning strand. It accomplishes such latter result by decreasing the height of the balloon when the tension in the balloon increases from a predetermined desired value, and by increasing the height of the balloon when the tension in the balloon decreases from such predetermined desired value. The tension of the strand a is thus decreased and increased, respectively, so that the plying point X may then function to cause more and less, respectively, of the ballooning strand a to be absorbed into the plied cord c. As a result, the diameter of the balloon is restored to the predetermined desired value.

The stability of an adjustable apex guide in the embodiment of FIGS. 1, 2, and 3 thereof can be improved somewhat under conditions of uniform weight per unit length of the ballooning strand, while enhancing its stability under conditions of increased weight per unit length of such strand, by making the apex guide 65 with a configuration similar to that of FIG. 7 of each of applicant's applications Ser. No. 261,704, filed December 14, 1951, now abandoned, and Ser. No. 4,973, filed January 27, 1960, now Patent No. 3,192,698. In each of such applications there is shown and described a vertically adjustable eye 534' for a balloon having a central guide at the apex of the ballooning yarn and a flared lower portion having an annular inner surface positioned to be brushed against by an intermediate portion of the ballooning yarn. Alternatively, the structure of the adjustable guide device 49 herein may be preserved, there being added thereto a bell similar to that designated 219 in Clarkson Patent No. 2,689,449, such bell being fixedly connected to the lower end of spindle 62 herein coaxial of the spindle. For the present purposes, such bell may have a size which is appreciably smaller in diameter and height than the Clarkson bell 219.

With either of such two alternative constructions described immediately above, the apparatus of FIGS. 1, 2, and 3 herein functions as follows:

With a ballooning strand a of constant weight per unit length: When the balloon expands from its desired diameter, the tension thereof decreases and (a) the lessened force of engagement between the strand a and the pulley 46 causes spring 71 to tend to cause spindle 62 to rotate to raise such spindle and the guide eye 65 therein, but (b) the increase in diameter of the balloon causes the ballooning strand a to engage the annular member beneath the apex guide more forcibly, thus tending to turn spindle 62 against the action of the spring 71, and thus tending to lower the spindle. Tendencies which are the reverse of (a) and (b), respectively, are present under such condition of constant weight per unit length of strand a upon a decrease in diameter of the balloon. With a proper choice of sizes and values of components, the opposing forces under (a) and (b) may be made substantially to cancel each other under normal operating conditions, so that the spindle 62 and guide 65 remain substantially fixed, the plying point X acting, as above described, to compensate automatically for changes in balloon diameter.

With an increase in weight per unit length of strand a sufficient to cause the tension in strand a to increase upon an increase in diameter of the balloon: Upon such increase in balloon diameter, (c) the increased force of engagement between the strand a and the pulley 46 tends to rotate spindle 62 against the action of spring 71 to lower spindle 62 and guide 65, and (d) the increased force of engagement between the ballooning strand a and the annular member beneath the apex guide tends to rotate spindle 62 against the action of spring 71 to lower spindle 62 and guide 65. The forces under (c) and (d) are thus additive, both functioning to decrease the height of the balloon and thus to decrease the tension of strand a to permit more of strand a to be absorbed into the plied cord at plying point X. Tendencies which are the reverse of (c) and (d), respectively, are present under such condition of increased weight per unit length of strand a upon a decrease in diameter of the balloon, the forces under both (c) and (d) then also being additive but acting to permit spring 71 to rotate spindle 62 to raise it and guide 65 to restore the tension of strand a in the balloon to the desired value.

In the embodiment of the apparatus shown in FIGS. 4 and 5, the spindle is generally designated by the reference character 78. Such spindle is supported on a frame 79 having a horizontal enclosure portion 80 within which is contained driving mechanism for the hollow main vertical shaft 81 of the spindle which is rotatably mounted in a bearing housing 82 secured to enclosed portion 80. Nonrotatably mounted on shaft 81 is a fixed support 84 upon which a package support 85 is mounted in turn. An inner strand package 86 on support 85 supplies an inner strand b. Strand b is paid off package 86, travels upward and then across the top of the package as indicated in dash lines in FIG. 4, and then proceeds downwardly to pass through a pre-tensioner 87 of the spring pressed washer type. From pre-tensioner 87, the strand b passes to a tensioning device 89 which is similar to the device 26 of the first disclosed embodiment. Strand b passes counter-clockwise about roller 90 of device 89, then clockwise around roller 91 thereof and between such roller and an adjustable leaf spring 92. From roller 91 the strand b travels successively about guides 94 and 95 to pass about a canted central guide roller 96 and thence centrally down into the bore of the hollow main shaft 81 of the spindle.

The outer, ballooned strand a is fed to spindle 78, in a direction from right to left, as from a multiple end beam as in Clarkson Patent No. 2,986,865. Strand a passes through a fixed guide 97 on the frame of the spindle, to a further fixed guide 99, and thence upwardly and to the right to a first, singles feeding portion of a combined capstan device generally designated 100. The construction and manner of operation of capstan 100 are illustrated most clearly in FIG. 5. Projecting forwardly from housing 80 is a horizontal shaft 101 which is driven in synchronism with and by the main shaft 81 of the spindle 81 by means such as gears not shown. Secured to shaft 101 is a stepped roller having a larger, forward circular cylindrical portion 102. Mounted on a bearing on a fixed, undriven stub shaft 105 projecting forwardly from housing 80 at a point spaced from shaft 101 is an idle roller 104. The outer strand a rises from guide 99 to pass clockwise over driven roller 102, passes over idle roller 104, and then repeatedly passes around such rollers in spaced runs, finally leaving roller 102 to pass to the right under a fixed roller guide 109, up partially about a fixed roller guide 110, thence to a roller guide 111 on a cross arm 112 on standard 115, and finally to an apex guide and balloon control device 49' which has the same construction and function as the device designated by the same reference character in FIGS. 1, 2, and 3. Parts of such balloon control device 49' and its support are designated by the same reference characters as in FIGS. 1, 2, and 3 but with added primes.

The described portion of the composite capstan 100 is provided with an idle presser roller 106 mounted on a lever 107 which is spring pressed to nip the runs of strand a between it and roller 102. The strand a is thus forwarded at substantially constant speed to the device 49 and thence into the ballon which in this instance has an upper portion 113 and a lower portion 114.

The balloon is generated by a flyer disc 116 which is fixed to shaft 81 of the spindle to rotate therewith. The strand a passes through an eye 118 in the outer edge of disc 116, and thence generally radially inwardly to pass into an opening through the wall of shaft 81 to a cord forming die at the plying point X, where equal lengths of strands a and b are wrapped about each other to form cord c.

From the plying point X the cord c passes down through the lower end of the hollow main shaft 81 and thence downwardly to a fixedly mounted guide roller 117. From roller 117 cord c rises to pass over the inner, smaller diametered circular cylindrical portion 119 of the stepped roller affixed to driven shaft 101. The cord c then passes over an inner idle guide roller 120 rotatably mounted on shaft 105. Roller 120 is separate from and rotates independently of roller 104. After passing in multiple spaced runs about rollers 119 and 120, the cord c leaves the capstan by passing downwardly partially around roller 120 to a fixed guide 124 and a movable guide 125 which is traversed by means not shown to lay the cord upon a bobbin 126 which is frictionally rim driven by a pair of rollers upon which it rests. One such driving roller, designated 127, is shown in FIG. 3 driven by means generally designated 129.

The portion of the capstan 100 which forwards cord c from the playing point X does so at substantially constant speed. Slippage of the cord on roller 119 is minimized by an idle presser roller 121, which is separate from and independent of presser roller 106. Roller 121 is mounted on a lever 122 which is spring pressed to urge the roller 121 forcibly against the portions of the cord lying between rollers 119 and 121.

The spindle 78 is provided with an auxiliary idle flyer 130 having an arm 131 with a guiding eye 132 therein through which the strand a of the balloon passes. Flyer 130 has an arm 134 extending oppositely from arm 131 for the purpose of counterbalancing the flyer. The bearing 135 for the flyer 130 is mounted on the removable lid 136 of an enclosure 137 disposed about package 86 and supported on the non-rotatable member 84 on shaft 81.

As shown, the eye 132 of the auxiliary flyer 130 lies outwardly of the shaft 81 of the spindle 78 at a radial distance which somewhat exceeds that of the eye 118 through the flyer disc 116. The upper portion 113 of the balloon thus always lies in the first quadrant, that is, the strand a always enters the eye 132 of the auxiliary flyer at an angle which is less than 90°, measured inwardly toward the axis of the flyer, between the plane of rotation of the flyer and a normal thereto at eye 132. It has been found that the use of the auxiliary flyer 130 permits the use of a higher tension of strand a in the balloon and a higher speed of rotation of the spindle shaft 81 than would be permissible without it, and that the auxiliary flyer assures the maintenance of portion 114 of the balloon free from contact with any fixed structure such as the lid 136 or the body 137 of the guard about package 86.

With the system of FIGS. 4 and 5, the tension conditions are somewhat different from those existing in the system of FIGS. 1, 2 and 3. The auxiliary flyer 130 acts in effect to create and maintain a short balloon 113 between it and the apex guide for device 49, the tension in such short balloon apparently being the primary determining factor as to the tension existing in the entire revolving loop 113, 114 which consists of the short balloon 113 and the length of rotating strand in the balloon portion 114 between the auxiliary flyer and the driven flyer disc 116. Such length of strand in balloon portion 114 serves primarily to drive the auxiliary flyer, in any event, the tension variations caused by variations in the length of strand in portion 114 of the balloon are additive to those of the short balloon 113.

The short balloon 113 is a single balloon which spins "above the bulge," that is, the balloon 113 has no true maximum diameter at all because such "bulge" is situated in the imaginary continuation of the short balloon 113 below the auxiliary flyer 130. In such short balloon 113 the yarn tension is high, and an increase in the diameter of the short balloon 113 results in a greater yarn tension. See pages 20 and 21 of "Balloon Control" by Grishin, revised and reprinted by T.M.M. (Research) Limited, from Platts, Bulletin, copyright 1956, by Platt Bros. (Sales) Limited, Oldham, England.

In the system of FIGS. 4 and 5, the plying point X never is, by itself, a compensator for variations in balloon diameter. The use of the auxiliary flyer thus requires for all conditions of operation of the apparatus, that is, with yarn of uniform or yarn of varying unit weight, a balloon compensator which responds to variations in balloon diameter. This follows from the fact that with an increase in the diameter of the balloon, the tension in the strand a increases, whether the weight per unit length of the strand remains constant or increases. Thus, the plying point per se cannot function to restore the balloon to the diameter at which the balloon has the desired tension equalling that imposed upon strand b as it approaches the plying point.

The plying point X, however, acting in conjunction with the balloon control device 49', maintains the balloon 113, 114 under stable control. Thus, upon an increase in diameter of the balloon, regardless of the cause, the device 49 acts to decrease the height of balloon portion 113, and thus to decrease the tension in strand a as it approaches the plying point. Upon such decrease of tension in strand a, the plying point functions to cause strand a to be absorbed into the cord c at a greater rate, thereby decreasing the diameter of the balloon 113, 114 to a predetermined desired value. When the diameter of the balloon 113, 114 decrease unduly, the control device 49 acts to increase the height of the balloon portion 113, whereby by plying point X then functions to cause strand a to be absorbed into the cord c at a slower rate, thereby increasing the diameter of the balloon 113, 114 to a predetermined desired value.

The third embodiment of cord forming apparatus in accordance with the invention is shown in FIGS. 6 and 7. Such apparatus, which is generally designed by the reference character 78', has the same construction as that of FIGS. 4 and 5; accordingly, the parts of the apparatus in FIGS. 6 and 7 which are the same as those of FIGS. 4 and 5 are designated by the same reference characters and need not be further described. As above noted, the apparatus of FIGS. 6 and 7 differs from that of FIGS. 4 and 5 in the manner of control of the height of the apex guide for the balloon.

The outer singles strand a, in this instance, is fed directly into the balloon, passing from guide roller 110 upwardly to a further guide roller 180 supported on a second, upper overarm 181 secured to standard 115. From roller 180 the strand a travels to a guide roller 182 on arm 181, the roller 182 being positioned to present the strand a in a vertical run along the axis of the balloon 113, 114. The strand a travels downwardly from roller 182, through the bore in spindle 62'' of a balloon control device 49'', through an apex guide 65'', and into the balloon.

The balloon control device 49'' is of the same construction as the previously described devices 49 and 49', with the exception of the means for varying the angle of lap of strand (in this instance cord c) about pulley 46''. Accordingly, only the parts which are new in device 49'' need be described here.

The cord c, upon issuing from the lower end of the hollow main shaft of the spindle, travels downwardly to an idle guide pulley 184 supported on the frame of the apparatus, thence laterally to a further guide pulley 185, upwardly in run 188 to a guide pulley 186, and laterally in run 187 to pulley 46'' of the balloon control device 49''. The pulleys 185 and 186 are mounted on fixed supporting structure, shown only generally. After passing partially about pulley 46'', the cord c travels in a run 189 to a guide pulley 190, and thence in a run 191 to a guide pulley 192 mounted on fixed structure, as shown. Then in a vertical run 194 (FIG. 6) which is angularly displaced from run 188, the cord c is brought downwardly to a fixedly mounted rotatable pulley 195, and laterally to a similar pulley 196 which presents it above pulley 117. From pulley 117 the cord travels to capstan 100 which takes it up at constant speed and forwards it to the take-up package or bobbin 126.

To vary the angle of lap of cord c about pulley 46'', the guide pulley 190 may be adjustably mounted on overarm 181 as shown. Thus the free end of the overarm is enlarged in plan to present a horizontal plate like end portion 197. The portion 197 is slotted at 199 in an arc coaxial with the spindle 62'' of the device 49''. The guide roller 190 may be mounted on a vertical stud shaft for rotation thereabout, the lower end of such being provided with a fixed collar which rests upon the upper surface of plate 197 on each side of slot 199. The lower end of such shaft may be threaded, a washer and nut on the shaft underlying the plate 197 on each side of slot 199. Such construction, which is conventional, is not specifically illustrated.

The hand of the thread on spindle 62'' and on the nut of the balloon control device 49'' in which the spindle is threadedly mounted is such that turning of the spindle 62'' by the spring 71'' raises the spindle to increase the height of the balloon, and turning of the spindle by the action of cord c upon pulley 46'' lowers the spindle. The tension of the cord c passing partially around pulley 46'' is essentially the sum of the tension in the balloon and the tension imposed upon the inner singles strand b by the constant tension device 89. Thus the tension in the cord c varies in proportion to and in the same direction as the tension of the ballooned singles strand a.

With suitable adjustment of the angle of lap of the cord c about pulley 46'' and of the winding of spring 71'', when the balloon 113, 114 is of the correct diameter, the cord will slide over the pulley without turning it, the spring 71'' balancing the torque imposed on the pulley by the cord. When the diameter of the balloon increases, the tension in strand a increases, as does that in cord c. Thereupon the cord turns pulley 46'' to lower the apex guide 65''; this decreases the tension in strand a so that the plying point X can then act to restore the balloon 113, 114 to the predetermined desired diameter. The reverse action takes place upon a decrease in balloon diameter, the consequent decrease in tension in cord c permitting the spring 71'' to raise the apex guide. This increases balloon tension, and thus permits the plying point to restore the balloon to its predetermined desired diameter.

It will be understood that the novel balloon control device of the invention may be used to advantage in a number of manners other than those shown. Thus the device may be employed, for example, in place of the balloon control device there shown in the system of Clarkson Patent No. 2,729,051, wherein both the inner and outer strands are forwarded at constant speed to the plying point by driven capstans. The balloon control device of the invention may also be used advantageously with uptwisters and downtwisters generally, either of the 1 x 1 or 2 x 1 type, the device governing the height of the balloon to maintain the tension of the balloning strand within desired limits.

In the embodiments of apparatus specifically shown herein, the rotatable tension sensitive pulley over which the singles strand entering the balloon or the plied cord runs is at rest when the apparatus is operating stably with the apex guide at a given height. In accordance with and within the scope of the present invention, however, there may be provided a balloon control generally in accordance with that of the above specifically illustrated and described embodiments but modified so that the balloon apex guide and the pulley which is drivingly connected to it rotates at a speed which is only slightly different from that corresponding to the speed of the singles strand (first two described embodiments) or the plied cord (last described embodiment) passing partially around the driving pulley for the apex guide.

Taking the balloon control of FIG. 4 as an example, such embodiment is modified as follows to produce such modified, rotating apex control. The spindle of FIG. 4 remains generally unchanged (as do those of FIGS. 1 and 6 if the second and third illustrated embodiments are to be similarly modified), with the exception of the manner of mounting the auxiliary flyer, to be described.

Referring to FIG. 2, the modified, rotating apex balloon control is made by mounting the nut 61 in an anti-friction bearing, such as a ball bearing, in fixed arm 44. The inner race of such bearing is fixedly connected to the nut 61, or itself serves as the nut. The upper tang 74 of spring 71 is fixedly connected to the inner race and/or nut 61 and rotates therewith. The inner race or nut 61 is driven at a constant speed as by being connected by suitable gearing to a shaft driven by and in synchronism with the main shaft 11 of the spindle. Alternatively, the inner race of the bearing and/or the nut 61 is driven by a synchronous electric motor, or by the strand of the balloon itself. Such driving of nut 61 may be accomplished in a manner similar to that shown in FIG. 2 of Klein Patent No. 3,066,472, the arm of the device which corresponds generally to arm 37 of Klein being driven by the balloon and being journalled on a suitable bearing on fixed supporting arm 44. Such arm is held at the same height as, and performs the further function of, the auxiliary flyer 130, which it replaces in the apparatus of the present FIG. 4. Such balloon driven radial arm functioning as an auxiliary flyer is connected by suitable reduction gearing, such as serially connected pinions and larger gears, mounted on arm 44 to drive the inner race and/or nut 61 at the desired lower speed synchronized with the speed of rotation of the balloon.

The pulley corresponding to pulley 46 of balloon control device 49' of FIG. 4 is replaced by a similar pulley having a circumference at its inner, strand receiving peripheral surface such that, when the spindle 62 of the balloon apex guide is driven as described and the strand engaging pulley is free of contact with strand a, the peripheral speed of such surface is somewhat less than the desired speed of travel of such strand into the balloon. When the strand a engages such pulley, it tends to drive the pulley, and thus screws the spindle 62 and the apex guide thereon down in the rotating nut 61, thereby winding up spring 71. With the proper choice of diameter of the strand engaging pulley which is drivingly connected to spindle 62, of the torque characteristics and initial adjustment of the spring 71, and of the angle $\alpha$ of engagement between the strand a and the pulley, under stable operating conditions the apex guide remains at a given height, the strand a then traveling somewhat faster than the surface of the pulley and thus slipping thereon to some extent.

Should the balloon 113, 114 increase in diameter, and thus the tension in strand a increase, the strand will engage the pulley more forcibly and thus momentarily drive it at a faster rate to screw spindle 62 and the balloon apex guide down until it reaches a new, temporarily stable position. This restores the balloon to its optimum diameter, as with the aparatus of FIG. 4. If the balloon should decrease in diameter from its optimum size, and thus the tension in strand a decrease, the strand will engage the pulley less forcibly and thus permit spring 71 to raise spindle 62 and the balloon apex guide to a new, temporarily stable position. This also restores the balloon to its optimum diameter, in the same manner as with the apparatus of FIG. 4.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. In strand twisting apparatus, means for rotating a running strand in the form of a balloon and for pulling the strand forward, means for guiding the apex end of the balloon comprising a strand guiding means positioned coaxially of the balloon adjacent the apex end thereof, adjustable means supporting the apex guide for movement axially of the balloon to vary the height of the apex guide for the balloon, and mechanism for controlling the last named means comprising rotatable tension sensitive means disposed to be engaged and turned in one direction by frictional engagement with a run of the strand spaced from and in tension transmitting relation with the balloon, means yieldingly urging the tension sensitive means to rotate in the opposite direction, and means responsive to rotation of the tension sensitive means to axially adjust said supporting means for the apex guide.

2. Apparatus as claimed in claim 1, wherein the means for adjusting the means for supporting the apex guide is such, and the tension sensitive means so controls said adjusting means that travel of the surface of the tension sensitive means in the direction of travel of the strand in engagement therewith urges the said apex guide support in the axial direction to decrease the height of the balloon.

3. Apparatus as claimed in claim 1, wherein the adjusting means for the apex guide supporting means comprises two threadedly engaged threaded means, one of said threaded means being connected to the apex guide supporting means so as to travel with such supporting means in the adjustment of the latter, the other of the threaded means being fixed from travel with the said supporting means.

4. Apparatus as claimed in claim 3, wherein the said other of the threaded means is fixed against rotation.

5. Apparatus as claimed in claim 3, comprising means mounting the said other of the threaded means for rotation, and means for rotating the said other threaded means at a constant speed.

6. Apparatus as claimed in claim 3, comprising means mounting the apex guide for rotation about its axis, means drivingly connecting the apex guide to the tension responsive means so that the guide and such tension responsive means rotate in synchronism, and an annular member connected coaxially of the apex guide to rotate therewith, said annular member having a surface adapted to be brushed against by an intermediate portion of the ballooning strand.

7. Apparatus as claimed in claim 6, wherein the means for rotating the balloon is a flyer, the flyer and apex guide for the balloon being so spaced axially of the balloon that the flyer engages the balloon substantially further from the apex guide than the maximum diameter of the balloon, whereby under conditions of substantially uniform weight per unit length of the ballooning strand the tension of the ballooning strand decreases upon an increase in diameter of the balloon and increases upon a decrease in diameter of the balloon.

8. Apparatus as claimed in claim 1, wherein the means supporting the apex guide is a hollow member having a passage therethrough and positioned coaxially of the balloon adjacent the apex end thereof, the ballooned strand passing through the passage in the hollow member, and the apex guide is an annular surface on the wall of the passage through the hollow member.

9. Apparatus as claimed in claim 8, wherein the hollow member is a shaft, one of said threaded means is a thread on the shaft extending longitudinally thereof, and the other of said threaded means is a nut threadedly engaging the thread on the shaft.

10. Apparatus as claimed in claim 1, wherein the tension responsive means is a body of revolution, and comprising means for guiding said run of the strand exteriorly of the balloon in a tight salient run partially about and in frictional contact with the peripheral surface of the body of revolution in a plane generally transverse to the axis of such body of revolution.

11. Apparatus for plying two singles strands together to form a plied strand by the ply wrapping process, said two singles strands and the plied strand forming a strand system, comprising a source of supply of a first singles strand, means for feeding the first singles strand forward from its source of supply to a plying point, a source of supply of a second singles strand, means for feeding the second singles strand forward from its source of supply, for forming a balloon in the thus fed second singles strand about the source of the second singles strand, and for feeding the second singles strand from the balloon to the plying point, means for pulling the plied strand from the plying point, and means for controlling the tension of the second singles strand in the balloon, said last named means including an apex guide for the balloon positioned coaxially of the balloon adjacent the apex end thereof, rotatable adjusting means supporting the apex guide for movement axially of the balloon to vary the height of the balloon, and mechanism for controlling the last named means comprising rotatable tension responsive means drivingly connected to the rotatable adjusting means and disposed to be engaged by and turned in one direction by a run of one strand of the system which is in tension transmitting relation with but exteriorly of and spaced from the balloon, and resilient means connected to the said tension responsive means yieldingly urging the tension responsive means to rotate in the opposite direction.

12. Apparatus as claimed in claim 11, wherein the tension responsive means is disposed between the balloon and the feeding means for the run of the one of the strands which engages the tension responsive means.

13. Apparatus as claimed in claim 12, wherein the feeding means for the said one strand which engages the tension responsive means feeds such strand at constant speed, and the run of said one strand extending from said feeding means to the balloon is tight and in tension transmitting relationship with the balloon.

14. Apparatus as claimed in claim 13, comprising means for subjecting the run of the first singles strand extending to the plying point to constant tension.

15. Apparatus as claimed in claim 14, wherein the strand which is engaged by the tension responsive means is the plied strand, and the tension responsive means engages the plied strand between the plying point and the feeding means for the plied strand.

16. Apparatus as claimed in claim 14, wherein the strand which is engaged by the tension responsive means is the second singles strand, and the tension responsive means engages the second single strand between the feeding means for the second singles strand and the balloon.

17. Apparatus as claimed in claim 12, wherein both the means for feeding the second singles strand toward the balloon and the means for feeding the plied strand from the plying point feed the respective strands at constant speed.

18. In strand twisting apparatus, means for rotating a running strand in the form of a balloon, means for pulling the strand forward, means for guiding the apex end of the balloon comprising a strand guiding means positioned coaxially of the balloon adjacent the apex end thereof, means supporting the apex guide, means supporting the means for rotating the balloon, means to adjust at least one of the last two named means axially of the balloon to vary the height of the balloon, and mechanism for controlling the last named means comprising rotatable tension responsive means disposed to be engaged and turned in one direction by a run of the strand spaced from and in tension transmitting relation with the balloon, means connected to the tension responsive means yieldingly urging the tension responsive means to rotate in the opposite direction, and means drivingly connecting the tension resposive means to the means for adjusting the height of the balloon to decrease the height of the balloon upon the turning of the tension responsive means in one direction and to increase the height of the balloon upon the turning of the tension responsive means in its other direction.

*19. Strand twisting apparatus comprising means for forming a loop in a travelling strand, an apex guide for the loop through which the strand enters the loops, means for rotating the loop, means for feeding the strand into the loop, an idle flyer disposed so that the portion of the loop between the apex guide and the flyer always rotates in the first quadrant, and means for controlling the tension of the strand in the loop comprising tension sensitive means disposed to engage the run of the strand extending between the feeding means and the loop.*

*20. Apparatus as claimed in claim 19, wherein the tension sensitive means comprises a body with a surface over which the strand slips, said strand imposing a torque upon the surface of the body over which it travels, and means opposing a rotation of the body in the direction of travel of the strand.*

*21. Apparatus as claimed in claim 20, wherein said strand imposes a greater torque upon said surface when the tension of the strand in the loop increases and imposes a smaller torque upon such surface when the tension of the strand in the loop decreases.*

*22. Strand twisting apparatus as claimed in claim 19, wherein the means for controlling the tension of the strand in the loop changes the size of the loop in response to variations in the force of engagement between the strand and the body.*

*23. Strand-twisting apparatus as claimed in claim 19, wherein the apparatus is of the skip twisting plying type, and the means for feeding the first mentioned strand engages such strand in advance of the loop and feeds such strand into the loop, and comprising a source of a second strand within the loop of the first mentioned strand, means for conducting the second strand from its source to a point where it is plied with the first strand adjacent the location at which the first strand leaves the loop, means for subjecting the second strand to tension in the run thereof extending to the plying point, and means beyond the plying point for taking up the resulting plied cord under tension.*

*24. Strand twisting apparatus as claimed in claim 23, wherein the strand feeding means is a capstan driven at constant speed, the strand and cord system composed of the portion of first strand extending from its feeding means to the plying point, the second strand extending from the means for subjecting it to tension to the plying point, and the cord extending from the plying point to the means for taking up the cord under tension is maintained tight with the loop as the only resiliently held salient zone therein, and the means for controlling the tension of the strand in the loop changes the size of the loop in response to variations in the tension of the strand in the loop.*

*25. Strand-twisting apparatus of the skip twisting plying type, comprising means for forming a loop in a first, traveling strand, an apex guide for the loop through which the first strand enters the loop, means for rotating the loop, means for feeding the first strand into the loop, an idle flyer disposed so that the portion of the loop between the apex guide and the flyer always rotates in the first quadrant, a source of a second strand within the loop of the first strand, means for conducting the second strand from its source to a plying point where it is plied with the first strand adjacent the location at which the first strand leaves the loop, means for subjecting the second strand to tension in the run thereof extending to the plying point, means beyond the plying point for taking up the resulting plied cord under tension, and means for controlling the tension of the strand in the loop comprising tension sensitive means disposed to engage the run of the cord which extends from and is in tension transmitting relationship with the plying point.*

*26. Apparatus as claimed in claim 25, wherein the tension sensitive means is a body of revolution with which the cord has friction torque-transmitting engagement and upon which it slips.*

*27. Apparatus as claimed in claim 26, wherein the strand and cord system composed of the portion of first strand extending from its feeding means to the plying point, the second strand extending from the means for subjecting it to tension to the plying point, and the cord extending from the plying point to the means for taking up the cord under tension is maintained tight with the loop as the only resiliently held salient zone therein.*

*28. Apparatus as claimed in claim 27, wherein the tension sensitive means engages the cord between the plying point and the means for taking up the plied cord.*

References Cited

The following references, cited by the Examiner, are of record in the patented file of this patent or the original patent.

UNITED STATES PATENTS

| | | | |
|---|---|---|---|
| Re. 24,380 | 10/1957 | Vibber | 57—58.3 |
| 2,729,051 | 1/1959 | Clarkson | 57—58.3 |
| 2,736,160 | 2/1956 | Vibber | 57—58.3 |
| 2,857,730 | 10/1958 | Vibber | 57—58.3 |
| 2,871,648 | 2/1959 | Vibber | 57—58.83 |
| 3,153,893 | 10/1964 | Vibber | 57—58.3 |
| 3,192,698 | 7/1965 | Vibber | 57—58.83 |

DONALD E. WATKINS, Primary Examiner